United States Patent [19]
Mori

[11] Patent Number: 4,484,565
[45] Date of Patent: Nov. 27, 1984

[54] DEVICE FOR SENSING MOVING LIGHT SOURCE

[76] Inventor: Kei Mori, 3-16-3-501, Kaminoge, Setagaya-ku, Tokyo, Japan

[21] Appl. No.: 520,777

[22] Filed: Aug. 5, 1983

[30] Foreign Application Priority Data

Aug. 11, 1982 [JP] Japan .................. 57-139298

[51] Int. Cl.³ .............................. F24J 3/02
[52] U.S. Cl. .................. 126/425; 250/203 R; 353/3
[58] Field of Search .......... 126/417, 424, 425, 441, 126/440; 250/203 R; 353/3

[56] References Cited

U.S. PATENT DOCUMENTS

| | | | |
|---|---|---|---|
| 3,305,686 | 2/1967 | Carter | 126/425 |
| 3,996,917 | 12/1976 | Trihey | 126/425 |
| 4,041,307 | 8/1977 | Napoli et al. | 250/203 R |
| 4,135,493 | 1/1979 | Kennedy | 126/425 |
| 4,179,612 | 12/1979 | Smith | 250/203 R |
| 4,225,781 | 9/1980 | Hammons | 250/203 R |
| 4,314,546 | 2/1982 | Miller | 126/425 |
| 4,316,084 | 2/1982 | Stout | 250/203 R |
| 4,367,403 | 1/1983 | Miller | 126/425 |
| 4,419,981 | 12/1983 | Mori | 250/203 R |
| 4,424,801 | 1/1984 | Mori | 353/3 |

*Primary Examiner*—Daniel J. O'Connor
*Attorney, Agent, or Firm*—Jordan and Hamburg

[57] ABSTRACT

A device for chasing a moving light source includes a plurality of photosensors arranged in elaborated positions for accurate operation. A top plate is formed with a calibrated cruciform opening to minimize indirect light tending to enter the device. Some of the photosensors expected to receive direct light through the cruciform opening are adjustable in position in two perpendicular directions relative to the remaining part of the device. The device can be disassembled for ease of production, maintenance, etc.

10 Claims, 21 Drawing Figures

DEVICE FOR SENSING MOVING LIGHT SOURCE

BACKGROUND OF THE INVENTION

The present invention relates to a device for automatically chasing the sun or like moving light source and supplying an output thereof to its associated apparatus for a position control and other purposes.

While chasing devices of the type described are in operation in various fields, a solar sensor assembly for chasing the sun is installed in a solar energy collection apparatus which has been developed to meet the increasing demand for energy saving. The solar sensor is designed to cause the light collecting surface of the solar energy collector to always face the sun thereby allowing it to effectively collect the solar energy. This is to fulfill the need that the solar energy be effectively collected for effective utilization thereof and, therefore, the collector be operated in the most efficient conditions.

A known type of solar energy collection apparatus comprises a number of lenses bundled up by a frame together with a solar sensor. The position of the frame is controlled in response to an output of the solar sensor so that the light input end of each lens may be oriented sunward as long as the sunlight is available. Concerning the solar sensor installed in the solar energy collector, various propositions have been presented and they generally comprise a box-shaped housing and a plurality of sensor elements mounted on the housing. The prior art solar sensors are acceptable but not fully satisfactory, however. Particularly, there is a demand for an ability for disassembly and adjustment which will facilitate the production and maintenance of such a sensor, and for a configuration which will minimize an error due to indirect light beams entering the housing while covering a wider range of light source positions.

SUMMARY OF THE INVENTION

It is an object of the present invention to provide a device for chasing a moving light source which can be disjoined to facilitate mounting sensor elements on a housing as well as adjustment and maintenance after the assembly.

It is another object of the present invention to provide a device for chasing a moving light source which overcomes influence of indirect incident light beams and the like to achieve accurate operation.

It is another object of the present invention to provide a device for chasing a moving light source which positively follows the light source over a substantial range of positions of the light source.

It is another object of the present invention to provide a generally improved device for chasing a moving light source.

A device for chasing a moving light source of the present invention includes a casing which is open at opposite ends thereof, a first closure member for closing one of the open ends of the casing and formed with a generally cruciform opening therethrough, and a second closure member for closing the other open end of the casing. A first photosensor is mounted on the second closure member substantially in register with the center of the cruciform opening in the first closure member. At least a pair of symmetrical second photosensors mounted on the second closure member such that each of the second photosensors is intersected by an imaginary perpendicular extending from an adjacent outermost edge of the cruciform opening in a predetermined portion thereof.

In accordance with the present invention, a device for chasing a moving light source includes a plurality of photosensors arranged in elaborated positions for accurate operation. A top plate is formed with a calibrated cruciform opening to minimize indirect light tending to enter the device. Some of the photosensors expected to receive direct light through the cruciform opening are adjustable in position in two perpendicular directions relative to the remaining paart of the device. The device can be disassembled for ease of production, maintenance, etc.

The above and other objects, features and advantages of the present invention will become apparent from the following detailed description taken with the accompanying drawings.

DESCRIPTION OF THE PREFERRED EMBODIMENT

While the device for chasing a moving light source of the present invention is susceptible of numerous physical embodiments, depending upon the environment and requirements of use, a substantial number of the herein shown and described embodiment have been made, tested and used, and all have performed in an eminently satisfactory manner.

While the present invention finds application to various kinds of chasing devices for moving light sources, the following description will concentrate on a solar sensor for use with a solar energy collection apparatus by way of example.

Figure 1:
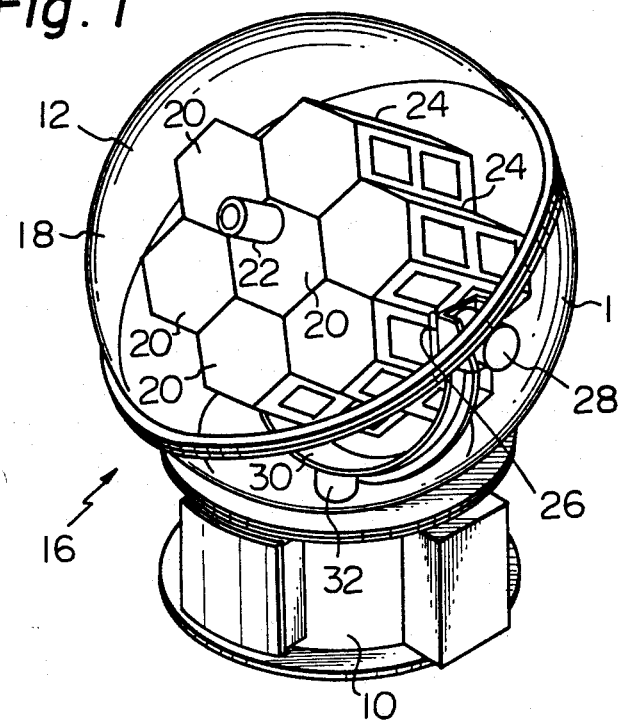
FIG. 1 is a perspective view of a solar energy collection apparatus to which a chasing device of the present invention is applicable.
Figure 2:
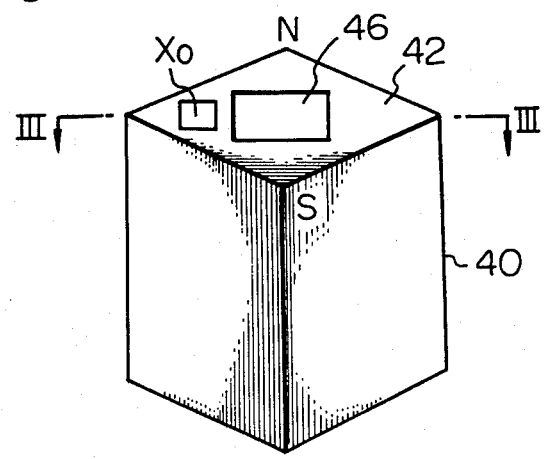
FIG. 2 is a perspective view of a prior art chasing device installed in the solar energy collector of FIG. 1.
Figure 3:
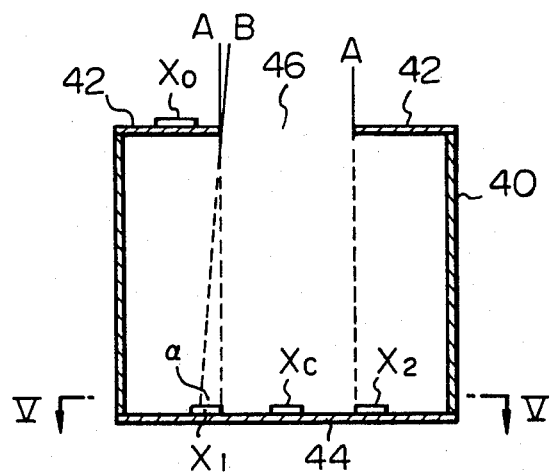
FIG. 3 is a section along line III—III of FIG. 2.
Figure 4:
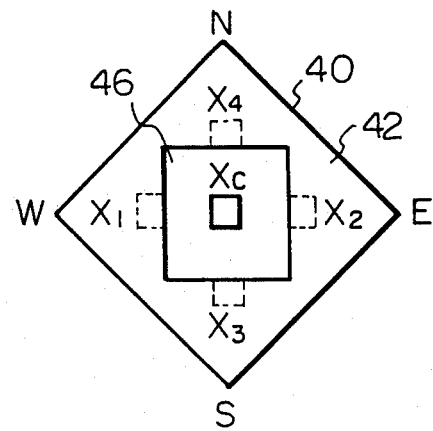
FIG. 4 is a plan view of the prior art chasing device.

Referring to FIG. 1 of the drawings, there is shown a solar ray collection apparatus which comprises a generally cylindrical base 10, a transparent dome-shaped head 12, and a transparent intermediate member 14 for interconnecting the base 10 and head 12. These members constitute a housing generally designated by the reference numeral 16. A lens assembly 18 is installed in the housing 16 and comprises a number of lenses 20 for converging sunlight, and a solar sensor 22 for sensing a varying position of the sun. The lenses 20 and solar sensor 22 are integrally supported by a frame 24 which is mounted on a shaft 26. The shaft 26 is selectively driven for rotation by a motor 28. A generally C-shaped arm 30 supports the integral assembly 20-28. A second shaft 32 extends perpendicular to the shaft 26 to be rotated by a second motor (not shown). In response to an output signal of the solar sensor 22, the first and second motors are controlled such that all the lenses 20 are always oriented sunward. The sunlight collected by the lenses 20 may be conducted by optical cables or the like to any desired location for illumination and other applications.

Figure 5:
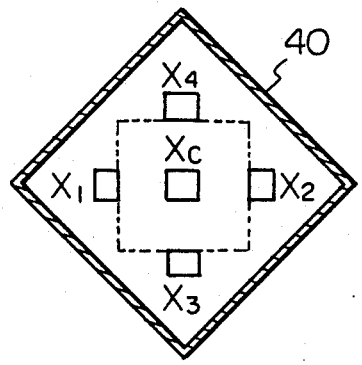
FIG. 5 is a section along line V—V of FIG. 3.

One example of the solar sensor 22 heretofore proposed is shown in FIGS. 2-5 in which N, E, W and S indicate the directions as usual. As shown, the solar sensor comprises a hollow casing 40, a top plate 42, a bottom plate 44, and photosensor $X_0$, $X_1$-$X_4$ and $X_c$. The top plate 42 is formed with a polygonal or circular opening 46 in a central portion thereof. As shown in FIG. 5, the photosensors $X_1$ and $X_2$ are paired and located to face each other and so are the photosensors $X_3$ and $X_4$. The location of the photosensors $X_1$-$X_4$ is such that their inner edges coincide with the inner edges of a shadow which will be formed by the top plate 42 when the casing 40 is oriented precisely sunward. The photosensor $X_c$ is positioned substantially at the center of the upper surface of the bottom plate 44. In this construction, so long as the casing 40 is directed exactly toward the sun, that is, while the sunlight is incident on the solar sensor as indicated by the letter A, the photosensors $X_1$-$X_4$ are irradiated not by the direct ray but by the indirect rays only and the photosensor $X_c$ is irradiated by both the direct and indirect rays. Meanwhile, when the sunlight is incident on the solar sensor as shown by the letter B, for example, due to dislocation of the casing 40 relative to the sun, the photosensor $X_1$ will receive the direct ray in its limited area $\alpha$ while receiving the indirect rays on the entire surface. In more detail, when the orientation of the casing 40 is exactly toward the sun, a same amount of light reaches the photosensors $X_1$ and $X_2$ ($X_3$ and $X_4$); on misorientation of the casing 40 relative to the sun, the amount of light incident on the photosensor $X_1$ ($X_3$) becomes different from that incident on the counterpart $X_2$ ($X_4$). The difference is sensed to perform a control such that the amounts of light incident on the photosensors $X_1$ and $X_2$ are equalized, that is, the casing 40 is positioned to become parallel to the direction A and thereby accurately sunward. This will cause the whole lens assembly 18 to accurately face the sun.

Figure 6:
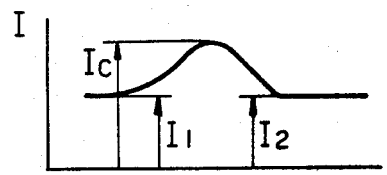
FIG. 6 is a graph showing a distribution of indirect light beams observed in the prior art chasing device.

Now, as shown in FIG. 6, the distribution of indirect light (I) within the casing 40 is larger in the central area than in the peripheral area. It is desirable to compensate for this difference in distribution for the purpose of accurately determining the position where the direct light traverses the sensor elements, i.e. the position $\alpha$.

This is implemented by a solar sensor which is capable of accurately sensing a deviation between the sensor orientation and the sun position as a numerical value, taking into account the distribution of indirect beams inside the casing as well. For details of this numerical sheme type of sensor, a reference is made to Japanese Patent Application No. 99993/1981.

Figure 7:
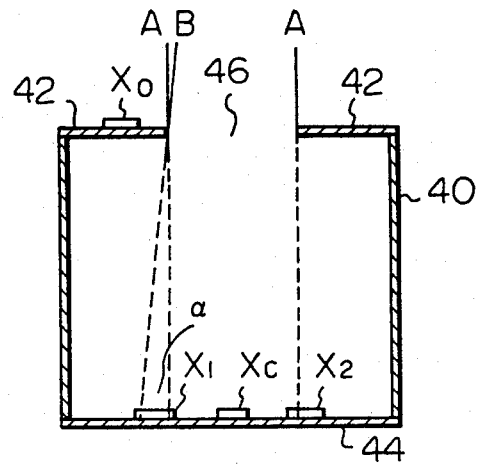
FIGS. 7-9 are views of other prior art chasing devices of the kind concerned.

Referring to FIG. 7, another prior art solar sensor is shown which precludes the occurrence that, when the sunlight is momentarily intercepted by clouds or the like, it becomes diffused for a moment to reach the photosensors $X_1$-$X_4$ either in an uneven distribution or with a certain time lag. The solar energy collector would sharply follow even such a momentary unbalance thereby causing hunting. In FIG. 7, the photosensors $X_1$-$X_4$ are located such that perpendiculars extending from the edges of the opening 46 intersect intermediate portions of the photosensors $X_1$-$X_4$, in contrast to the construction of FIGS. 2-5 in which the perpendiculars merge into the edges of the photosensors.

What is required for the construction of FIG. 7 in finishing the sensors $X_1$-$X_4$ is only the accuracy in width, because the perpendiculars from the edges of the opening 46 need only be individually somewhere in the intermediate portions of the respective sensor elements. Meanwhile, because the border line for determining the presence/absence of direct light is located in the intermediate portion of each sensor element, the sensor element attains a linear output characteristic for a shift of the border line. Additionally, even an externally derived disturbance has no substantial effect on the operation inasmuch as the output is biased in advance in the area which has received direct light. In short, the signal-to-noise ratio and linearity are improved to enhance the ease of control, compared to the previously described solar sensor.

Figure 8:
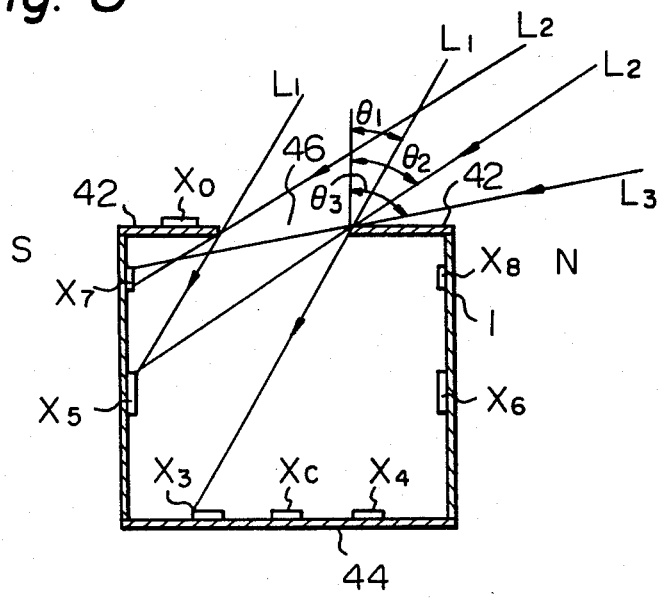

Referring to FIG. 8, there is shown another prior art solar sensor which does not loose its function even when the sun gets behind the clouds for a substantial period of time. As shown, the solar sensor comprises a pair of photosensors $X_5$ and $X_6$ in addition to the sensors $X_0$, $X_3$, $X_4$ and $X_c$. The sensors $X_5$ and $X_6$ are individually mounted on intermediate inner walls of the casing 40 (south and north walls parallel to the direction of movement of the sun). With this construction, if the incident angle of the sunlight to the solar sensor exceeds $\theta_1$ making the photosensors $X_3$ and $X_4$ inoperable any longer, the chasing function is fulfilled by the photosensors $X_5$ and $X_6$. As the sun reappears to become incident on the sensor assembly after a substantial period of clouding, the assembly will immediately start chasing the sun again. To further enlarge the operable angular range of the solar sensor, another pair of photosensors $X_7$ and $X_8$ may be located above the photosensors $X_5$ and $X_6$, in which case the operable range will be extended to an angle $\theta_3$, In FIG. 8, $L_1$, $L_2$ and $L_3$ individually indicate light from the sun.

Figure 9:
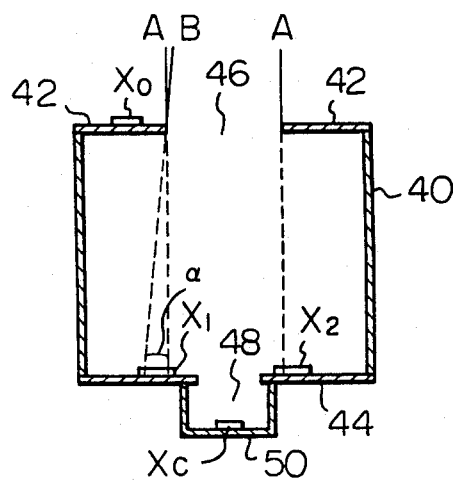

Still another prior art solar sensor is shown in FIG. 9 which overcomes the dependence of the photoelectric sensitivity (photoelectric conversion coefficient) of the central photosensor $X_c$ on the temperature, which would detriment accurate sun sensing. In FIG. 9, the bottom plate 44 is made of a heat transmitting material and formed with a hole 48 in its central area which is aligned with the opening 46. The photosensor $X_c$ is mounted on a base plate 50 made of a heat transmitting and electrically insulating material. The base plate 50 spans the hole 48 carrying the photosensor $X_c$ on its inner surface. With this construction, the solar heat reaching the photosensor $X_c$ will be effectively dissipated through the base plate 50 and bottom plate 44.

Figure 10:
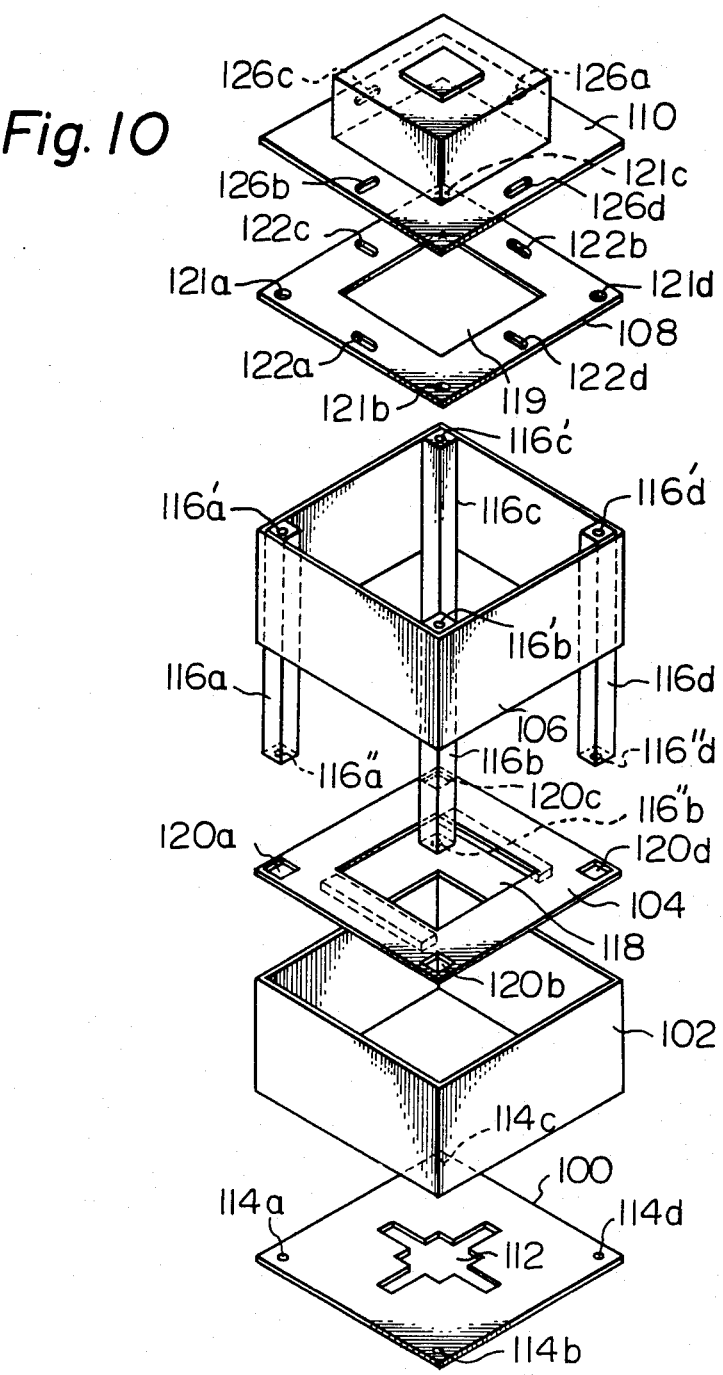
FIG. 10 is an exploded perspective view of a chasing device embodying the present invention.
Figure 11:
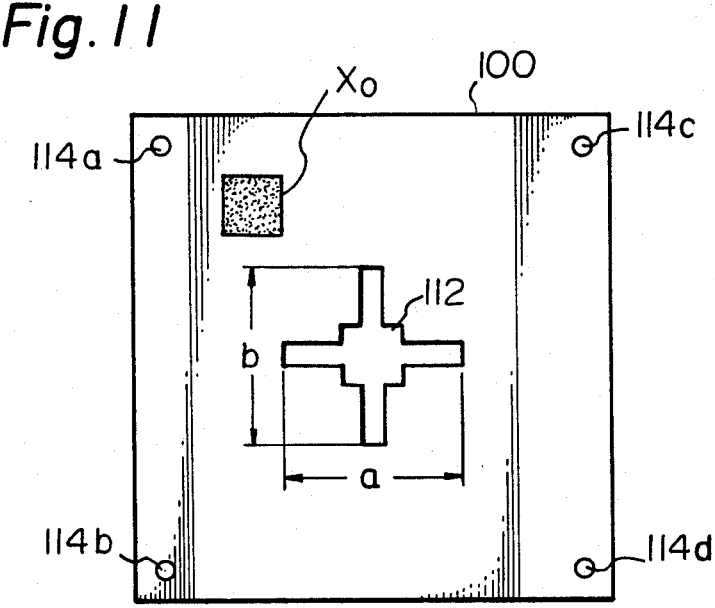
FIG. 11 is a plan view of a top plate included in the chasing device shown in FIG. 10.
Figure 12:
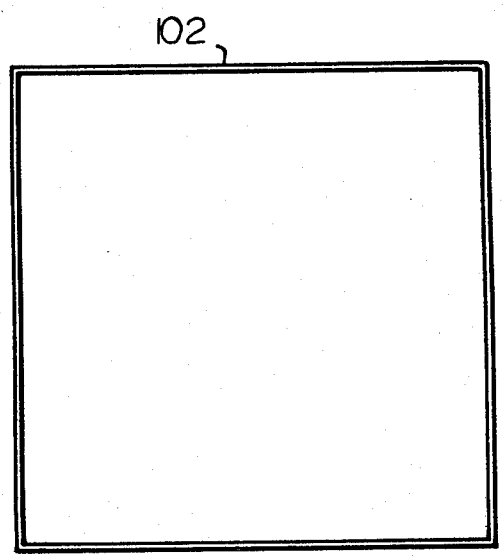
FIG. 12 is a plan view of a first casing of the chasing device shown in FIG. 10.
Figure 13:
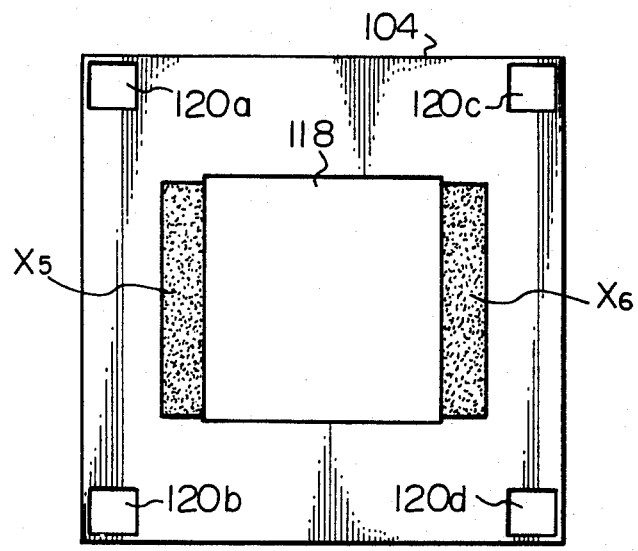
FIG. 13 is a plan view of an intermediate plate of the chasing device shown in FIG. 10.
Figure 14:
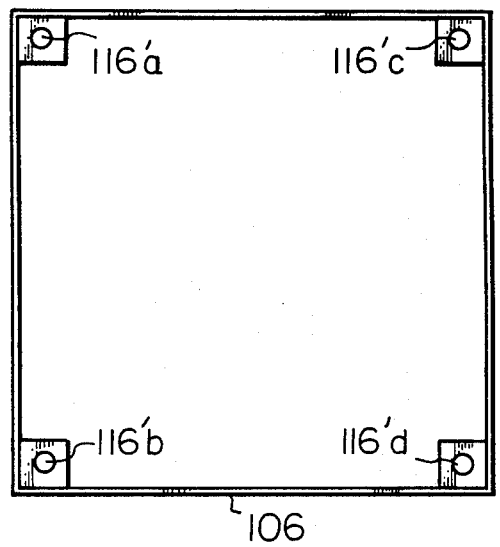
FIG. 14 is a plan view of a second casing of the chasing device shown in FIG. 10.
Figure 15:
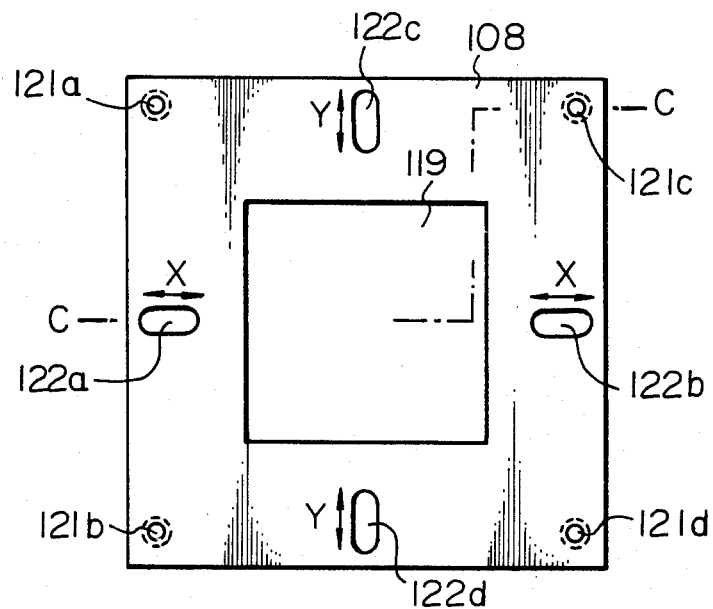
FIG. 15 is a plan view of an adjusting plate of the chasing device shown in FIG. 10.
Figure 16:
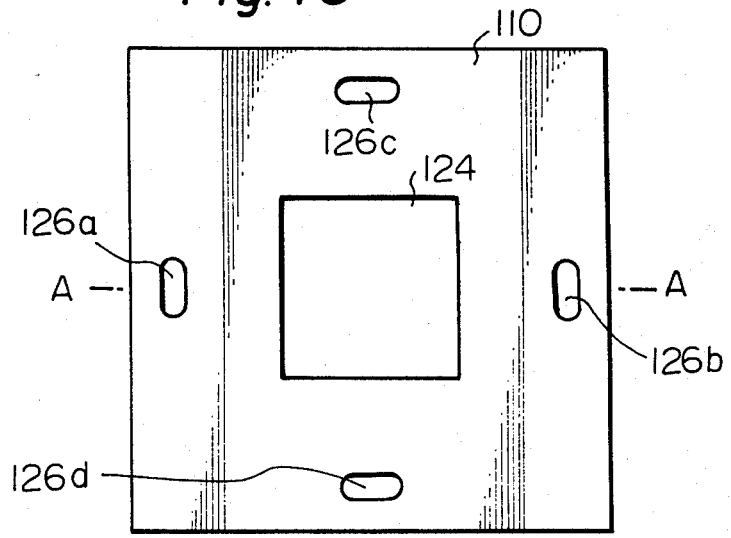
FIG. 16 is a plan view of a bottom plate of the chasing device shown in FIG. 10.
Figure 17:
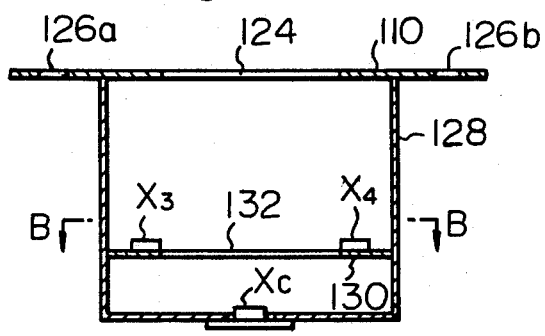
FIG. 17 is a section along line A—A of FIG. 16.
Figure 18:
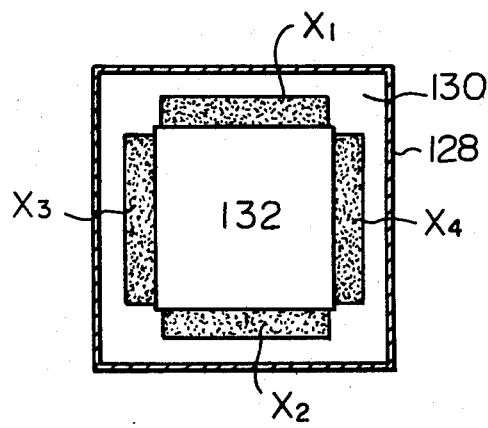
FIG. 18 is a section along line B—B of FIG. 17.
Figure 19:
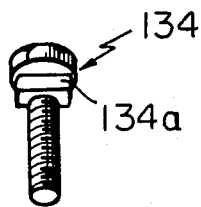
FIGS. 19 and 20 are perspective views of screws which are suitably applicable to the construction in accordance with the present invention.
Figure 20:
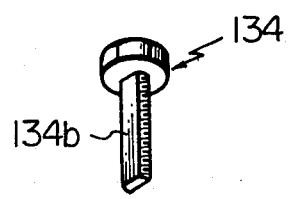

Referring now to FIGS. 10-21, a solar sensor of the present invention is shown which constitutes an improvement over the various prior art constructions described. In FIG. 10 the solar sensor is illustrated upside down to facilitate better understanding of its unique features. The solar sensor generally comprises a top plate 100, a first hollow casing 102, an intermediate plate 104, a second hollow casing 106, an adjusting plate 108, and a bottom plate 110. The top plate 100 is formed with a generally cruciform opening 112 in its central portion and oversized holes 114a-114d at its four corners. Screws will be passed through the oversized holes 114a-114d into four posts 116a-116d which are integral with the second casing 106, as will be described later in detail. A photosensor $X_0$ corresponding to the previously mentioned photosensor $X_0$ is mounted on the top of the plate 100. The four corners of the first casing 102 are dimensioned complementary to the four posts 116a-116d so that coupling the casing 102 over the posts 116a-116d while guiding the former with the latter will bring them into an integral and accurately positioned structure. The intermediate plate 104 is formed with a generally rectangular opening 118. Assuming that the cruciform opening 112 of the top plate 100 has a length a in one direction and a length b in the other direction perpendicular to the first, the opening 118 is dimensioned equal to or somewhat longer than the length a along a set of opposite sides and equal to or somewhat longer than the length b along the other set of opposite sides. Holes 120a-120d are formed through the four corners of the plate 104 in order to allow the posts 116a-116d to pass through the intermediate plate 104, thereby positioning the intermediate plate 104 relative to the casing 106.

Figure 21:
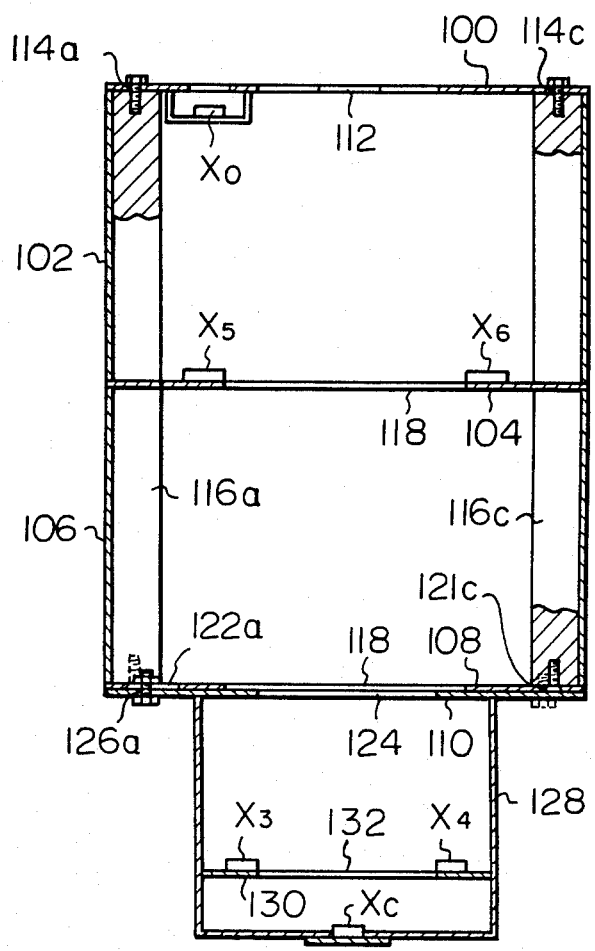
FIG. 21 is a sectional side elevation of the chasing device of the present invention, with an adjusting plate shown in a section along line C—C of FIG. 15.

Photosensors $X_5$ and $X_6$ equivalent in effect to those previously mentioned are mounted on the intermediate plate 104 along at least a pair of symmetrical opposite edges which define the opening 118 together with the others. The post 116a is formed with threaded holes 116'a and 116"a, the post 116b with threaded holes 116'b and 116"b, the post 116c with threaded holes 116'c and 116"c, and the post 116d with threaded holes 116'd and 116"d. After the four posts 116a-116d are inserted into the first casing 102 in the manner described, screws are individually threaded into the holes 116"a-116"d through the oversized holes 114a-114d of the top plate 100 as shown in FIG. 21, thereby joining the top plate 100, casing 102, intermediate plate 104 and casing 106.

The adjusting plate 108 has in its central area a rectangular opening 119 whose one side is slightly longer than the length a of the cruciform opening 112, the other side slightly longer than the length b. The adjusting plate 108 also has oversized holes 121a-121d through which screws will be passed to fasten the plate 108 to the posts 116a-116d, and elongate slots 122a-122d for fastening the bottom plate 110 to the adjusting plate 108 while allowing the former to move in two perpendicular directions relative to the latter. Screws (not shown) are passed through the oversized holes 121a-121d to be threaded into the holes 116'a-116'd in the posts 116a-116d as shown in FIG. 21, thereby fastening the plate 108 to the casing 106. The plate 108 is counterbored along the edges of the holes 121a-121d to conceal the heads of the screws.

The bottom plate 110 is formed with an opening 124 which is dimensioned equal to the lengths a and b of the cruciform opening 112 of the top plate 100, and elongate slots 126a-126d which will cooperate with the elongate slots 122a-122d of the adjusting plate 108. The orientations of the slots 126a-126d are such that, if the slots 122a and 122b of the plate 108 extend in the X direction (FIG. 15) and the slots 122c and 122d in the Y direction (FIG. 15) for example, the slots 126a and 126b of the bottom plate 110 extend in the Y direction and the slots 126c and 126d in the X direction. A box 128 having an open top is mounted on the bottom of the bottom plate 110. The box 128 carries thereinside a photosensor mount 130 formed with an opening 132 which is smaller than the opening 124 and larger than a photosensor $X_c$. Photosensors $X_1$-$X_4$ corresponding to those mentioned in conjunction with the prior art assemblies are supported by the mount 130 while being positioned in the manner described with reference to FIG. 3 or 7. The photosensor $X_c$ corresponds to the already mentioned one and is located below the opening 132 in the same manner as in FIG. 9. It is not always necessary to locate the photosensor $X_c$ at a predetermined spacing from the mount 130; it may be loaded even on the mount 130 as described with reference to FIG. 3.

In assembly, after the slots 122a-122d of the adjusting plate 108 have been respectively aligned with the slots 126a-126d of the bottom plate 110, screws 134 are inserted into the slots 122a-122d and then into the slots 126a-126d. Nuts are then fit on the screws 134 from the back of the bottom plate 110.

Examples of the screws 134 suitable for the construction described above are shown in FIGS. 19 and 20. The screw 134 in FIG. 19 has a portion 134a which is narrower than the slots 122a-122d of the adjusting plate 108 in one diametrical direction, wider than the slots 126a-126d of the bottom plate 110 in the other diametrical direction perpendicular to the first, and thicker than the adjusting plate 108. The screw 134 in FIG. 20, on the other hand, has a shank 134b which is narrower than the slots 122a-122d in one diametrical direction and wider than the slots 126a-126d in the other diametrical direction perpendicular to the first.

When the screws 134 are inserted into the slots 126a-126d via the slots 122a-122d and nuts are loosely fit on the screws, the bottom plate 80 is free to move relative to the plate 108 in the two perpendicular directions. Under this condition adjusting plate 108 is fastened to the posts 116a-116d of the second casing 106 using the oversized holes 121a-121d. Such a manner of assembly permits the bottom plate 110 to be adjusted in two perpendicular directions relative to the plate 108 after the solar sensor is fixed to the solar energy collector as shown in FIG. 1. After the adjustment, the nuts on the screws 134 will be tightened to secure the bottom plate 110 to the plate 108, the slots 122a-122d in the plate 108 serving to prevent rotation of the screws 134.

The adjustability stated above is desirable in the following respect. Generally, a solar energy collector such as one shown in FIG. 1 is assembled by mounting the solar sensor sunward, positioning light input ends of light conducting cables in conformity to the so located solar sensor and such that light converged by their associated lenses become incident thereon in the most efficient manner, and then fixing the light input ends of the cables to the collector body. On failure of the solar sensor, it is usually removed from the collector body, repaired and then mounted again on the collector body.

In this instance, the adjustability particular to the present invention eliminates the need for repositioning the lenses and cables, that is, what is required is to simply adjust the solar sensor in the manner previously discussed.

In operation, the photosensors $X_1$-$X_4$ on the mount 130 are exposed to the light which enters the solar sensor via the cruciform opening 112 in the top plate 100, opening 118 in the adjusting plate 108, and opening 124 in the bottom plate 110. Meanwhile, the photosensor $X_c$ is irradiated by the light which advances through the opening 132 in the mount 132 after the openings 112, 118 and 124. Only the direct light is allowed to reach the photosensors $X_1$-$X_4$ and $X_c$ because all the diffused components will be removed while the light sequentially advances through the openings. Concerning the photosensors $X_5$ and $X_6$ on the intermediate plate 104, they are irradiated by the light which enters the solar sensor via the entire length of the cruciform opening 112 (a in this particular embodiment). When the incident angle of the sunlight on the solar sensor is relatively large as represented by the angle $\theta_3$ in FIG. 8, the photosensors $X_1$-$X_4$ and $X_c$ will miss the sun. This does not matter at all because the photosensors $X_5$ and $X_6$ will roughly sense the position of the sun and cause the solar energy collector to move until the photosensors $X_1$-$X_4$ become exposed to the direct light from the sun.

In summary, it will be seen that the present invention provides a device for chasing a moving light source which features ease of assembly and maintenance, accuracy and adjustability of positioning, least possibility of erroneous detection due to indirect light, and applicability to a light source which moves over a substantial angular range.

Various modifications will become possible for those skilled in the art after receiving the teachings of the present disclosure without departing from the scope thereof. For example, the solar sensor assembly may be finished to have a non-reflective inner periphery and a reflective outer periphery with or without the top plate 100 shaped convex toward the outside, taking into account the influence of light diffusion and heat on the photosensors. As shown in FIG. 21, the top plate 100 may be formed with a recess large enought to accommodate the photosensor $X_0$ so as to reduce the heat acting thereon.

What is claimed is:

1. A device for chasing a moving light source, comprising:
    a casing which is open at opposite ends thereof;
    a first closure member for closing one of the open ends of said casing and formed with a generally cruciform opening therethrough;
    a second closure member for closing the other open end of the casing;
    a first photosensor mounted on the second closure member substantially in register with the center of the cruciform opening in the first closure member; and
    at least a pair of symmetrical second photosensors mounted on the second closure member such that each of said second photosensors is intersected by an imaginary perpendicular extending from an adjacent outermost edge of the cruciform opening on a predetermined portion thereof.

2. The device as claimed in claim 1, in which said predetermined portion of each of the second photosensors is an inner edge thereof.

3. The device as claimed in claim 1, in which the predetermined portion is an intermediate portion.

4. The device as claimed in claim 1, in which the casing and the first and second closure members are removable from each other.

5. The device as claimed in claim 1, in which the second closure member is formed with a recess in a position thereof which substantially coincides with the center of the cruciform opening, the first photosensor being received in said recess.

6. The device as claimed in claim 1, further comprising an intermediate plate supported by a substantially axially intermediate portion of the casing, said intermediate plate being formed with a substantially rectangular opening defined by a set of opposite sides each of which is at least equal in length to one extension of the cruciform opening and a set of opposite sides each of which is at least equal in length to the other extension of the cruciform opening perpendicular to said one extension.

7. The device as claimed in claim 6, further comprising at least a pair of third photosensors mounted on the intermediate plate to respectively extend along opposite edges of the opening in the intermediate plate.

8. The device as claimed in claim 6, in which the casing, the first and second closure members and the intermediate plate are removable from each other.

9. The device as claimed in claim 1, further comprising an adjusting plate interposed between the first and second closure members, said adjusting plate being formed with a generally rectangular opening which is defined by a set of opposite sides each of which is at least equal in length to one extension of the cruciform opening and a set of opposite sides at least equal in length to the other extension of the cruciform opening perpendicular to said one extension, the second closure member being mounted on the adjusting plate to be movable in perpendicular two directions relative thereto.

10. The device as claimed in claim 9, in which the casing, the first and second closure members and the adjusting plate are removable from each other.

* * * * *